US012693199B2

(12) United States Patent
Kisaragi

(10) Patent No.: US 12,693,199 B2
(45) Date of Patent: Jul. 28, 2026

(54) ROTARY VISCOMETER AND FLUID CONVEYANCE DEVICE

(71) Applicant: Panasonic Intellectual Property Management Co., Ltd., Osaka (JP)

(72) Inventor: Amiri Kisaragi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 305 days.

(21) Appl. No.: 18/273,020

(22) PCT Filed: Dec. 1, 2021

(86) PCT No.: PCT/JP2021/044044
§ 371 (c)(1),
(2) Date: Jul. 18, 2023

(87) PCT Pub. No.: WO2022/172557
PCT Pub. Date: Aug. 18, 2022

(65) Prior Publication Data
US 2024/0085297 A1    Mar. 14, 2024

(30) Foreign Application Priority Data

Feb. 10, 2021    (JP) ................................. 2021-019438

(51) Int. Cl.
*G01N 11/14* (2006.01)
(52) U.S. Cl.
CPC .................................... *G01N 11/14* (2013.01)
(58) Field of Classification Search
CPC ....................................................... G01N 11/14
See application file for complete search history.

(56) References Cited

U.S. PATENT DOCUMENTS 2,828,621 A     4/1958   Rosenberg
2,957,339 A    10/1960   Penny et al.
(Continued)

FOREIGN PATENT DOCUMENTS

CN      102980836 A     3/2013
CN      104697899 A     6/2015
(Continued)

OTHER PUBLICATIONS

International Search Report issued in corresponding International Application No. PCT/JP2021/044044 dated Jan. 18, 2022, with English translation.
(Continued)

*Primary Examiner* — Kristina M Deherrera
*Assistant Examiner* — Jean F Morello
(74) *Attorney, Agent, or Firm* — Rimon P.C.

(57)    ABSTRACT

A rotary viscometer includes: a measurement rotor that comes into contact with a fluid whose viscosity is to be detected; a rotating shaft that is connected to the measurement rotor; a drive part that rotates the measurement rotor via the rotating shaft; a measurement part that measures the viscosity of the fluid on the basis of torque generated in accordance with rotation of the measurement rotor; a housing that accommodates at least the measurement rotor, the rotating shaft, and the drive part; and a window part that is provided in the housing such that the rotating shaft is observable from the outside.

5 Claims, 2 Drawing Sheets

(56)  References Cited

U.S. PATENT DOCUMENTS

| | | | | |
|---|---|---|---|---|
| 4,062,225 | A | 12/1977 | Murphy, Jr. et al. | |
| 5,777,215 | A | 7/1998 | Calatzis et al. | |
| 5,877,410 | A | 3/1999 | Duke | |
| 6,167,752 | B1 | 1/2001 | Raffer | |
| 10,697,876 | B1 * | 6/2020 | Jamison | G01N 11/14 |
| 2006/0075805 | A1 * | 4/2006 | Moonay | G01N 11/14 |
| | | | | 73/54.28 |
| 2010/0018294 | A1 | 1/2010 | Tonmukayakul et al. | |
| 2014/0137638 | A1 * | 5/2014 | Liberzon | G01N 11/14 |
| | | | | 73/54.28 |
| 2017/0276584 | A1 * | 9/2017 | Ye | E21B 21/08 |
| 2019/0144910 | A1 * | 5/2019 | Su | G01N 21/00 |
| | | | | 435/29 |
| 2022/0018750 | A1 | 1/2022 | Jamison et al. | |
| 2022/0205891 | A1 * | 6/2022 | Kim | G01N 11/08 |

FOREIGN PATENT DOCUMENTS

| | | | |
|---|---|---|---|
| CN | 110146411 | A | 8/2019 |
| CN | 110763595 | A | 2/2020 |
| GB | 839541 | A | 6/1960 |
| JP | H07-20032 | A | 1/1995 |
| JP | H11-264789 | A | 9/1999 |
| WO | 2015/081323 | A1 | 6/2015 |
| WO | 2020/159523 | A1 | 8/2020 |

OTHER PUBLICATIONS

Extended European Search Report issued in the corresponding European patent Application No. 21925801.9 dated May 6, 2024.

* cited by examiner

ROTARY VISCOMETER AND FLUID CONVEYANCE DEVICE

CROSS-REFERENCE TO RELATED APPLICATIONS

This application is the U.S. National Phase under 35 U.S.C. § 371 of International Patent Application No. PCT/JP2021/044044, filed on Dec. 1, 2021, which in turn claims the benefit of Japanese Patent Application No. 2021-019438, filed on Feb. 10, 2021, the entire content of each of which is incorporated herein by reference.

BACKGROUND

Field of the Invention

The present disclosure relates to rotary viscometers and fluid conveyance devices.

Description of the Related Art

For example, in the field of manufacturing lithium-ion secondary batteries and the like, a coating technique is known in which an electrode slurry containing an electrode active material is applied to the surface of a substrate such as metal foil so as to form an electrode active material layer on the surface of the substrate. Generally, in such a coating technique, the viscosity of the electrode slurry is measured using a viscometer. As the viscometer, a rotary in-line viscometer is known (see, for example, Patent Literature 1). In a general rotary viscometer, a measurement rotor immersed in a fluid whose viscosity is to be detected at a predetermined speed, and the viscosity of the fluid is detected based on the torque generated at that time.

Patent Literature 1: Japanese Unexamined Patent Application Publication No. H11-264789

The electrode active material in the electrode slurry tends to be easily agglomerated. Aggregates generated in the electrode slurry can interfere with the rotation of the measurement rotor to such an extent that a determined rotational speed cannot be maintained. The viscosity measured while the rotation of the measurement rotor is being interfered can be detected as an abnormal value. However, when the viscosity of the fluid is controlled using a conventional rotary viscometer, it is difficult for the controller to immediately determine whether the abnormal value is due to the abnormal rotation of the measurement rotor or the change in the viscosity of the fluid.

SUMMARY OF THE INVENTION

In this background, a purpose of the present disclosure is to provide a technology for simplifying fluid viscosity control.

One embodiment of the present disclosure relates to a rotary viscometer. This rotary viscometer includes: a measurement rotor that comes into contact with a fluid whose viscosity is to be detected; a rotating shaft that is connected to the measurement rotor; a drive part that rotates the measurement rotor via the rotating shaft; a measurement part that measures the viscosity of the fluid on the basis of torque generated in accordance with rotation of the measurement rotor; a housing that accommodates at least the measurement rotor, the rotating shaft, and the drive part; and a window part that is provided in the housing such that the rotating shaft is observable from the outside.

Another embodiment of the present disclosure relates to a fluid conveyance device. This fluid conveyance device includes: a piping part through which a fluid whose viscosity is to be detected flows; and the rotary viscometer according to the above embodiment that is installed in the piping part.

Optional combinations of the aforementioned constituting elements, and implementations of the present disclosure in the form of methods, apparatuses, and systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
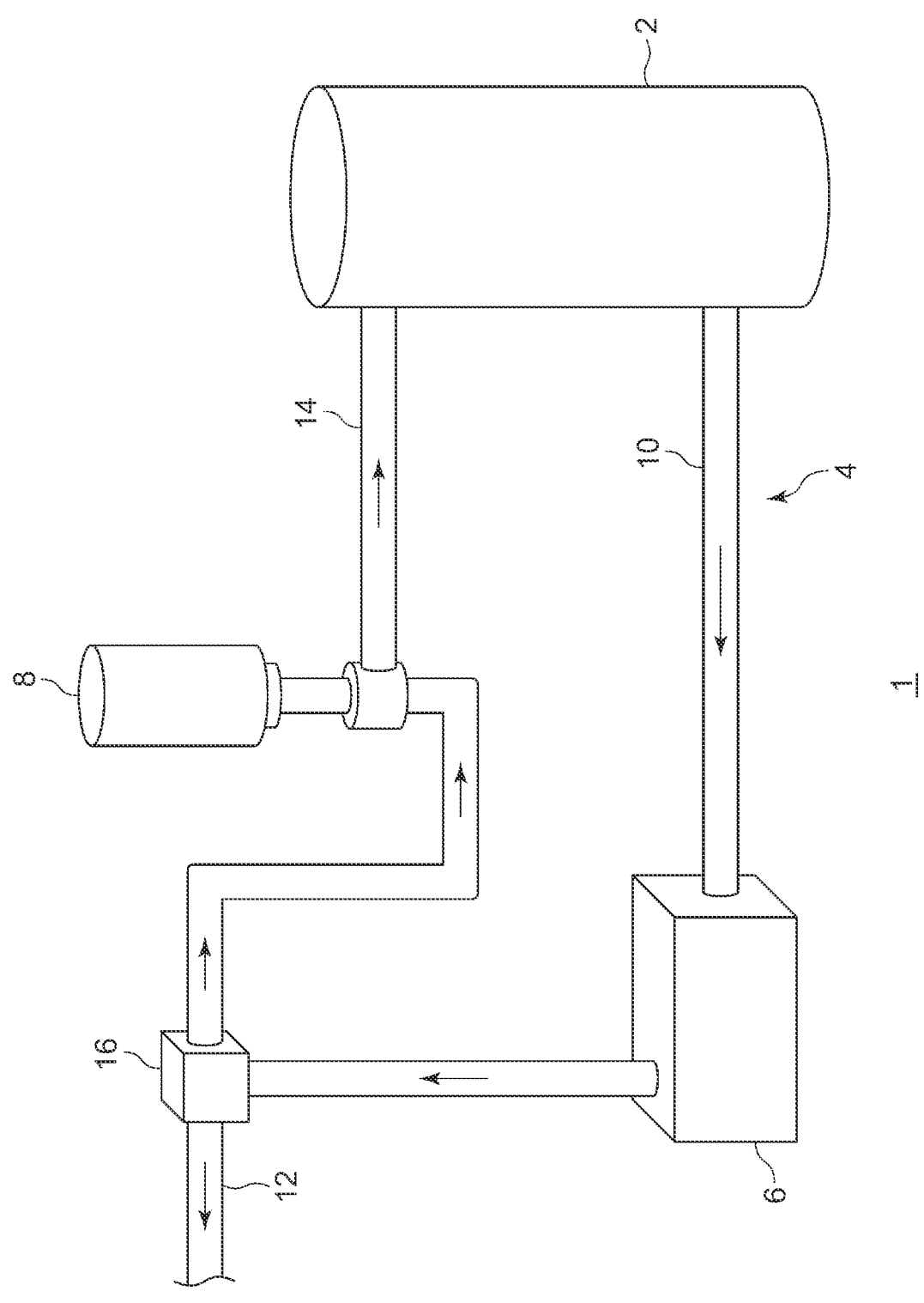
FIG. 1 is a schematic diagram of a fluid conveyance device according to an embodiment.

Hereinafter, the present disclosure will be described based on a preferred embodiment with reference to the figures. The embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

FIG. 1 is a schematic diagram of a fluid conveyance device 1 according to an embodiment. The fluid conveyance device 1 includes a tank 2, a piping part 4, a pump 6, and a rotary viscometer 8. The tank 2 stores a fluid whose viscosity is to be detected. In the present embodiment, a fluid is an electrode slurry of a secondary battery. The electrode slurry is, for example, a mixture of a cathode active material or an anode active material and a solvent. In the case of a standard lithium-ion secondary battery, the cathode active material is lithium cobalt oxide, lithium iron phosphate, or the like. The anode active material is graphite or the like.

The piping part 4 is connected to the tank 2. The fluid stored in the tank 2 flows through the piping part 4 and is transported to equipment (not shown) for the next process such as a coating device. The piping part 4 according to the present embodiment has a first pipe 10, a second pipe 12, and a third pipe 14. The first pipe 10 is connected to the tank 2 at one end and to a joint 16 at the other end. The second pipe 12 is connected to the joint 16 at one end and to the equipment for the next process at the other end. The third pipe 14 is connected to the joint 16 at one end and to the tank 2 at the other end.

In the middle of the first pipe 10, a pump 6 is installed. The pump 6 flows fluid from the tank 2 into the piping part 4. The pump 6 can consist of a publicly-known pump such as a diaphragm pump. In the middle of the third pipe 14, a rotary viscometer 8 is installed. The rotary viscometer 8 measures the viscosity of the fluid flowing through the third pipe 14 and transmits the measurement result to a control device (not shown). Therefore, the rotary viscometer 8 according to the present embodiment is of an in-line type installed in the piping part 4 through which the fluid flows. The rotary viscometer 8 may be installed in the tank 2 or the like. The controller of the fluid (the user of the rotary viscometer 8) can keep track of the viscosity of the fluid via the control device. The structure of the rotary viscometer 8 will be explained in detail later.

The fluid stored in the tank 2 is sent to the joint 16 via the first pipe 10 by driving the pump 6. A portion of the fluid that has reached the joint 16 is sent to the equipment for the next process via the second pipe 12. Further, another portion of the fluid that has reached the joint 16 is returned to the tank 2 via the third pipe 14. Then, in the process of passing through the third pipe 14, the viscosity of the fluid is measured. For example, most of the fluid is sent to the equipment for the next process via the second pipe 12, and a small amount of fluid is sent to the rotary viscometer 8 via the third pipe 14 for viscosity measurement.

Figure 2:
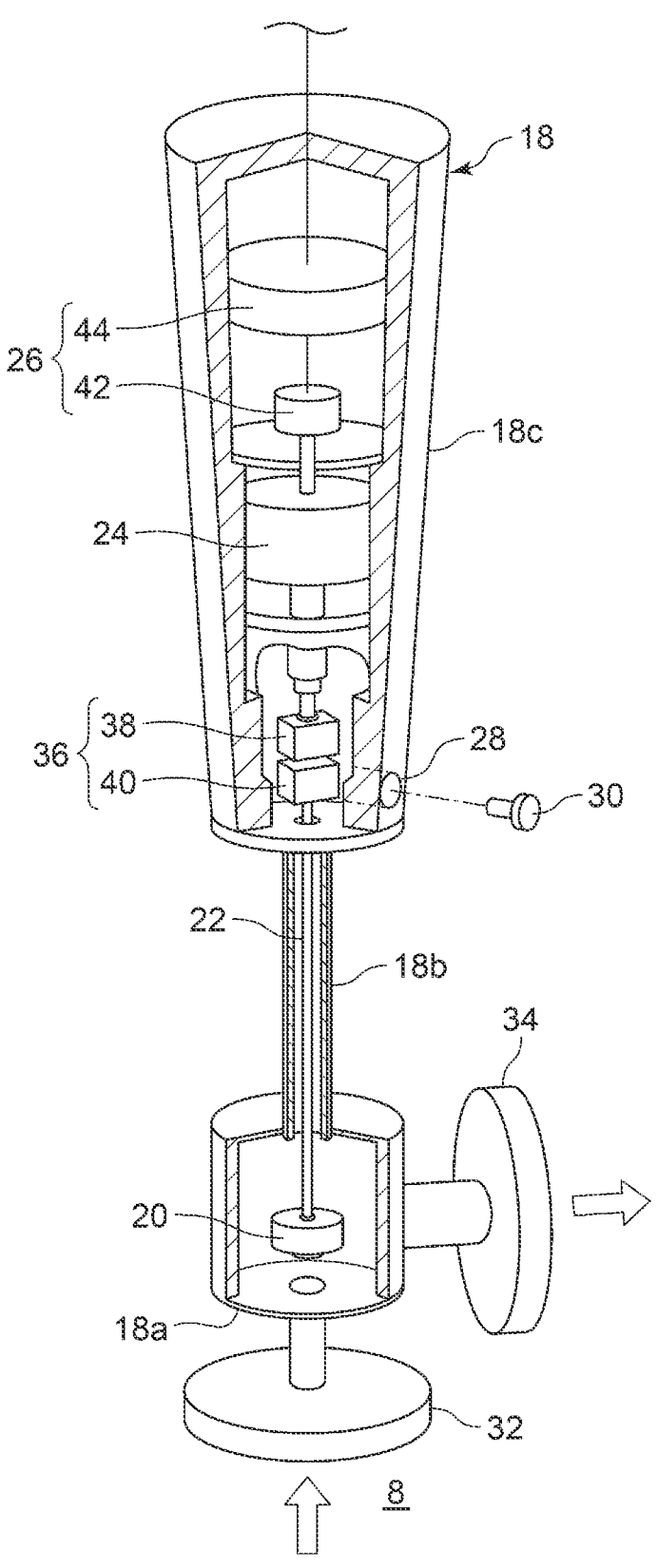
FIG. 2 is a perspective view of a rotary viscometer.

The structure of the rotary viscometer 8 will be explained in detail next. FIG. 2 is a perspective view of the rotary viscometer 8. In FIG. 2, a part of the housing 18 is cut out in order to show the internal structure of the rotary viscometer 8. The rotary viscometer 8 includes a housing 18, a measurement rotor 20, a rotating shaft 22, a drive part 24, a measurement part 26, a window part 28, and a lid member 30.

The housing 18 includes a lower housing 18*a*, an intermediate housing 18*b*, and an upper housing 18*c*. FIG. 2 illustrates a cylindrical housing 18. However, the shape of the housing 18 is not particularly limited. The housing 18 accommodates at least the measurement rotor 20, the rotating shaft 22, and the drive part 24. In the present embodiment, the measurement part 26 is also accommodated in the housing 18. The measurement part 26 may be arranged outside the housing 18. The lower housing 18*a* is connected to the third pipe 14. The intermediate housing 18*b* connects the lower housing 18*a* and the upper housing 18*c*.

The lower housing 18*a* accommodates the measurement rotor 20 and one end of the rotating shaft 22. The lower housing 18*a* has a fluid inlet 32 and a fluid outlet 34 that communicate the inside and outside of the housing 18. The fluid inlet 32 is connected to the upstream side of the third pipe 14. The fluid outlet 34 is connected to the downstream side of the third pipe 14. The fluid flowing through the third pipe 14 flows into the lower housing 18*a* from the fluid inlet 32. The fluid inside the lower housing 18*a* flows from the fluid outlet 34 to the third pipe 14. Thereby, the measurement rotor 20 can come into contact with the fluid flowing into the lower housing 18*a*. For example, the measurement rotor 20 is immersed in the fluid filling the lower housing 18*a*.

The rotating shaft 22 is connected to the measurement rotor 20 at one end. Then, from the lower housing 18*a* through the intermediate housing 18*b*, the other end reaches inside the upper housing 18*c*. The measurement rotor 20 can rotate along with the rotation of the rotating shaft 22. The connecting part between the lower housing 18*a* and the intermediate housing 18*b* is sealed such that the fluid in the lower housing 18*a* does not flow into the intermediate housing 18*b*.

The upper housing 18*c* accommodates the other end of the rotating shaft 22, the drive part 24, and the measurement part

26. The other end of the rotating shaft 22 is connected to the output shaft of the drive part 24. The drive part 24 rotates the measurement rotor 20 via the rotating shaft 22. The drive part 24 can consist of a publicly-known motor or the like. The rotating shaft 22 according to the present embodiment has a coupling 36 for transmitting the torque of the drive part 24 to the measurement rotor 20 between one end and the other end. The coupling 36 is arranged in the upper housing 18*c*. The coupling 36 as an example consists of a so-called magnetic coupling and has a drive magnet 38 and a driven magnet 40. The drive magnet 38 is fixed to the other end side (drive part 24 side) of the rotating shaft 22, and the driven magnet 40 is fixed to one end side (measurement rotor 20 side) of the rotating shaft 22.

When a load less than or equal to the maximum torque that can be transmitted by the coupling 36 is acting on the measurement rotor 20 side of the rotating shaft 22, the drive magnet 38 and the driven magnet 40 rotate synchronously while substantially maintaining a relative position in the rotation direction. Thereby, the torque of the drive part 24 is transmitted to the measurement rotor 20 via the rotating shaft 22 such that the measurement rotor 20 rotates. On the other hand, when the rotation of the measurement rotor 20 is hindered by aggregates or the like generated in the fluid and a load exceeding the maximum torque that can be transmitted by the coupling 36 acts on the measurement rotor 20 side of the rotating shaft 22, the driven magnet 40 cannot follow the rotation of the drive magnet 38, and the connection between the drive magnet 38 and the driven magnet 40 is cut off. Thereby, an excessive load can be suppressed from being applied to the drive part 24. The coupling 36 may be omitted. Alternatively, two or more couplings 36 may be provided.

The measurement part 26 measures the viscosity of the fluid based on the torque generated in accordance with the rotation of the measurement rotor 20. The measurement part 26 as an example has a torque sensor 42 and a viscosity calculation part 44. The torque sensor 42 is connected to the drive part 24 and detects the torque generated in the drive part 24 when the measurement rotor 20 is rotated. The torque sensor 42 can consist of a publicly-known sensor that uses a differential transformer or the like. The torque sensor 42 transmits the detection result to the viscosity calculation part 44.

The viscosity calculation part 44 is implemented by an element such as a CPU or memory of a computer or by a circuit as a hardware configuration, and by a computer program or the like as a software configuration. It will be obvious to those skilled in the art that the viscosity calculation part 44 may be implemented in a variety of manners by a combination of hardware and software. For example, the viscosity calculation part 44 stores a conversion table in advance that associates torque and fluid viscosity. Further, the viscosity calculation part 44 drives the drive part 24 such that the measurement rotor 20 rotates at a predetermined rotation speed. Then, based on the conversion table, the viscosity of the fluid is calculated from the torque detected by the torque sensor 42 when the measurement rotor 20 is rotating at the predetermined rotation speed. The viscosity calculation part 44 transmits the calculated viscosity to the control device.

The control device as an example stores a viscosity threshold in advance. Then, when the value of the viscosity calculated by the viscosity calculation part 44 exceeds the threshold, that is, when the value of the viscosity is an abnormal value, the control device notifies the controller of the viscosity.

The housing 18 is provided with a window part 28 such that the rotating shaft 22 is observable from the outside. In the present embodiment, a window part 28 is provided on the upper housing 18c such that the coupling 36 of the rotating shaft 22 is observable. Further, the window part 28 is provided such that in the coupling 36, the driven magnet 40 directly connected to the measurement rotor 20 side of the rotating shaft 22 is observable. The window part 28 as an example is formed by a through hole provided in the upper housing 18c. The controller of the fluid can keep track of the rotation state of the measurement rotor 20 by observing the rotation state of the rotating shaft 22 (for example, rotation speed, the number of rotations, etc.), more specifically, the rotation state of the coupling 36 through the window part 28.

For example, observation of the rotation state of the rotating shaft 22 through the window part 28 when an abnormal value of the viscosity is measured allows for immediate determination of whether or not the cause of the abnormal value is due to the rotation abnormality of the measurement rotor 20. As the method for observing the rotation state, a publicly-known method such as an optical method or visual observation can be employed. Further, a sensor that detects the rotation state of the rotating shaft 22 may be installed on the window part 28. Examples shown as the sensor that detects the rotation state include a tachometer such as a non-contact laser measurement tachometer.

A lid member 30 is detachably set in the window part 28. By removing the lid member 30 from the window part 28, the controller of the fluid can observe the state of the rotating shaft 22 (driven magnet 40 in the present embodiment) through the window part 28. By blocking the window part 28 with the lid member 30 except when observing the rotating shaft 22, it is possible to suppress the entry of slurry powder and other foreign matter in the atmosphere into the housing 18 through the window part 28. Although the material constituting the lid member 30 is not particularly limited, the material is preferably a material, such as resin, that has lower thermal conductivity than that of metal. Thereby, even when the drive part 24 generates heat, it is possible to suppress the lid member 30 from having a high temperature. Therefore, the safety and workability when the controller removes the lid member 30 can be enhanced.

As explained above, a rotary viscometer 8 according to the present embodiment includes: a measurement rotor 20 that comes into contact with a fluid whose viscosity is to be detected; a rotating shaft 22 connected to the measurement rotor 20; a drive part 24 that rotates the measurement rotor 20 via the rotating shaft 22; a measurement part 26 that measures the viscosity of the fluid on the basis of torque generated in accordance with rotation of the measurement rotor 20; a housing 18 that accommodates at least the measurement rotor 20, the rotating shaft 22, and the drive part 24; and a window part 28 provided in the housing 18 such that the rotating shaft 22 (driven magnet 40 in the present embodiment) is observable from the outside.

Thereby, compared with a conventional viscometer that does not have a window part 28 and thus cannot observe the inside of a housing 18, the cause of an abnormal value of viscosity that is measured can be determined more easily. Therefore, it is possible to simplify the viscosity control of a fluid and improve the productivity of the fluid. Further, the reliability of measured values from the rotary viscometer 8 can be increased. Furthermore, since the labor required to identify the cause of the abnormal value can be reduced and the time can be shortened, the productivity of products manufactured using the fluid (electrode plate and battery in the present embodiment) can also be increased. Further, the rotary viscometer 8 according to the present embodiment includes a lid member 30 that is detachably set in the window part 28. For this reason, when the rotating shaft 22 is not observed, the window part 28 can be blocked. Thereby, the risk of dust or the like entering the housing 18 and causing the rotary viscometer 8 to fail can be reduced.

Further, the rotary viscometer 8 according to the present embodiment is of an in-line type installed in the piping part 4 (the third pipe 14 in the present embodiment) through which the fluid flows. Thereby, the productivity of the fluid and even the productivity of the products manufactured using the fluid can be further increased.

In the present embodiment, the fluid whose viscosity is detected by the rotary viscometer 8 is an electrode slurry of a secondary battery. The electrode slurry has a relatively high viscosity and tends to generate aggregates. For this reason, the rotation of the measurement rotor 20 is easily hindered. Therefore, if the fluid is an electrode slurry, simplification of viscosity control can be more effectively achieved by the rotary viscometer 8 according to the present embodiment. The rotary viscometer 8 can also be used for viscosity measurement of fluids other than the electrode slurry.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the constituting elements included in each embodiment are also valid as embodiments of the present disclosure. Hatching applied to a cross section of a drawing does not limit the material of an object to which the hatching is applied.

The embodiments may be defined by the items described in the following.

[Item 1]

A rotary viscometer (8) comprising:

a measurement rotor (20) that comes into contact with a fluid whose viscosity is to be detected;

a rotating shaft (22) that is connected to the measurement rotor (20);

a drive part (24) that rotates the measurement rotor (20) via the rotating shaft (22);

a measurement part (26) that measures the viscosity of the fluid on the basis of torque generated in accordance with rotation of the measurement rotor (20);

a housing (18) that accommodates at least the measurement rotor (20), the rotating shaft (22), and the drive part (24); and a window part (28) that is provided in the housing (18) such that the rotating shaft (22) is observable from the outside.

[Item 2]

The rotary viscometer (8) according to Item 1, wherein a lid member (30) that is detachably set in the window part (28).

[Item 3]

The rotary viscometer (8) according to Item 1 or 2 being of an in-line type that is installed in the piping part (4) through which the fluid flows.

[Item 4]

The rotary viscometer (8) according to any one of Items 1 through 3, wherein the fluid is an electrode slurry of a secondary battery.

[Item 5]

The rotary viscometer (8) according to any one of Items 1 through 4, wherein the rotating shaft (22) has a coupling (36) for transmitting torque of the drive part (24) to the measurement rotor (20), and the window part (28) is provided such that the coupling (36) is observable.

[Item 6]

The rotary viscometer (8) according to any one of Items 1 through 5, comprising:

a sensor that is installed on the window part (28) and that detects the rotation state of the rotating shaft (22).

[Item 7]

A fluid conveyance device (1) comprising:

a piping part (4) through which a fluid whose viscosity is to be detected flows; and the rotary viscometer (8) according to any one of Items 1 through 6 that is installed in the piping part (4).

The invention claimed is:

1. A rotary viscometer comprising:

a measurement rotor that comes into contact with a fluid whose viscosity is to be detected;

a rotating shaft that is connected to the measurement rotor;

a drive part comprising a motor that rotates the measurement rotor via the rotating shaft;

a measurement part comprising a sensor that measures the viscosity of the fluid based on torque generated in accordance with rotation of the measurement rotor;

a housing that accommodates at least the measurement rotor, the rotating shaft, and the drive part; and a window part that is provided in the housing such that the rotating shaft is observable from outside the housing, wherein the housing includes a lower housing, an intermediate housing, and an upper housing, wherein the lower housing is connected to a piping part, wherein the intermediate housing connects the lower housing and the upper housing, wherein the lower housing accommodates the measurement rotor and one end of the rotating shaft and has a fluid inlet and a fluid outlet that communicate an interior of the housing and an exterior of the housing, wherein the fluid inlet is connected to the upstream side of the piping part, and the fluid outlet is connected to the downstream side of the piping part, wherein the measurement rotor comes into contact with a fluid flowing into the lower housing, wherein the rotating shaft is connected to the measurement rotor at one end, and, from the lower housing through the intermediate housing, the other end of the rotating shaft reaches an interior of the upper housing, wherein the connecting part between the lower housing and the intermediate housing is sealed such that the fluid in the lower housing does not flow into the intermediate housing, wherein the upper housing accommodates the other end of the rotating shaft and the drive part, wherein the rotary viscometer is an in-line type that is installed in the piping part through which the fluid flows, wherein the rotating shaft has a coupling for transmitting torque of the drive part to the measurement rotor, wherein the coupling has a drive magnet and a driven magnet, wherein the drive magnet is fixed to a drive part side of the rotating shaft, wherein the driven magnet is fixed to a measurement rotor side of the rotating shaft, and wherein the window part is provided such that both the coupling and the driven magnet are observable from outside the housing.

2. The rotary viscometer according to claim 1, comprising:

a lid member that is detachably set in the window part.

3. The rotary viscometer according to claim 1, wherein the fluid is an electrode slurry of a secondary battery.

4. The rotary viscometer according to claim 1, comprising:

a sensor that is installed on the window part and that detects a rotation state of the rotating shaft.

5. A fluid conveyance device comprising:

a piping part through which a fluid whose viscosity is to be detected flows; and the rotary viscometer according to claim 1 that is installed in the piping part.

* * * * *